United States Patent [19]

Muto

[11] Patent Number: 4,484,279
[45] Date of Patent: Nov. 20, 1984

[54] VEHICLE SPEED CONTROL METHOD
[75] Inventor: Masahito Muto, Toyota, Japan
[73] Assignee: Toyota Jidosha Kogyo Kabushiki Kaisha, Toyota, Japan
[21] Appl. No.: 301,036
[22] Filed: Sep. 10, 1981
[30] Foreign Application Priority Data
    Sep. 18, 1980 [JP] Japan .................... 55/128590
[51] Int. Cl.³ ............................. G05D 13/58
[52] U.S. Cl. ................... 364/426; 364/431.07; 180/170
[58] Field of Search ........... 364/424, 426, 424.1, 364/431.04, 431.07; 180/176–179, 170

[56]         References Cited
       U.S. PATENT DOCUMENTS
    3,804,193  4/1974  Skuta ................... 180/170
    4,046,213  9/1977  Larson ................. 180/177
    4,138,723  2/1979  Nehmer et al. ........ 364/424

Primary Examiner—Gareth D. Shaw
Assistant Examiner—Ronni S. Malamud
Attorney, Agent, or Firm—Kenyon & Kenyon

[57]         ABSTRACT

A vehicle speed control method for automatically maintaining the vehicle speed of an automobile at a desired speed without driver operation of the accelerator pedal includes a step of performing only the set operation for equalizing a reference speed to a detected actual vehicle speed irrespective of the actuation period of the set switch when the set switch is actuated under a condition in which the automatic vehicle speed control operation has not previously been executed. Thereafter, the desired vehicle speed can be correctly set to be higher, unchanged, or lower when the automatic vehicle speed control operation is initiated for less than a certain interval, within that interval, or longer than that interval.

5 Claims, 8 Drawing Figures $V > V_M$ $V = V_M$ $V < V_M$

VEHICLE SPEED CONTROL METHOD

BACKGROUND OF THE INVENTION

The present invention relates to a vehicle speed control method for an automobile, and more particularly relates to a method and apparatus for automatically maintaining the vehicle level at a desired speed without driver operation of the accelerator pedal.

In a conventional vehicle speed control method, the actual running speed of a vehicle at the time when a setting switch is actuated is stored in a storing device, then, the vehicle speed is subsequently compared with the stored vehicle speed to adjust the throttle valve setting in order to maintain the vehicle speed at the stored level. After the desired speed has been set (set operation), the same switch is also used for decreasing the desired vehicle speed (retardation operation) as well as for slightly increasing the desired vehicle speed (increase operation). The particular one of the above-mentioned operations to be selectively carried out depends on the length of time the setting switch is actuated. The increase operation is carried out when the actuation period of the setting switch is shorter than a first interval, the set operation is carried out when the actuation period of the setting switch is longer than the first interval but shorter than a second interval, and the retardation operation is carried out when the actuation period of the setting switch is longer than the second interval.

However, according to such conventional method, the increase operation or the retardation operation may be carried out depending upon the actuation period of the setting switch even when an automatic vehicle speed control operation is to be commenced, and thus the stored vehicle speed may often not be set to a value which is desired by the driver. In other words, the desired vehicle speed at the beginning of the automatic vehicle speed control operation may often vary in accordance with the actuation period of the setting switch.

SUMMARY OF THE INVENTION

It is, therefore, an object of the present invention to provide a vehicle speed control method whereby the desired vehicle speed can be correctly set irrespective of the actuation period of the setting switch when the automatic vehicle speed control operation is to be initiated.

Another object is to provide apparatus for setting the speed of a vehicle irrespective of the actuation period.

According to the present invention, a desired vehicle speed is maintained by comparing a speed signal, which is generated in response to the detected actual vehicle speed, with a reference signal representative of the desired vehicle speed. This is accomplished by first determining whether the vehicle speed control operation has been carried out or not, when an instruction switch is actuated; If the vehicle speed control has been carried out before the instruction switch is actuated, either a set operation is performed for equalizing the reference speed to a detected actual vehicle speed, or an increase operation is performed for increasing the reference speed, or a retardation operation is performed for reducing the actual vehicle speed and for changing the reference speed to be equal to the reduced actual vehicle speed. The operation to be performed is selected in response to the actuation period of the instruction switch; and if the vehicle speed control has not been carried out until the instruction switch is actuated, only the set operation is performed for equalizing the reference speed to a detected actual vehicle speed, irrespective of the length of time the instruction switch is actuated.

The above and other related objects and features of the present invention will be apparent from the description of the present invention set forth below, with reference to the accompanying drawings, as well as from the claims.

DETAILED DESCRIPTION OF THE PREFERRED EMBODIMENT

Figure 1:
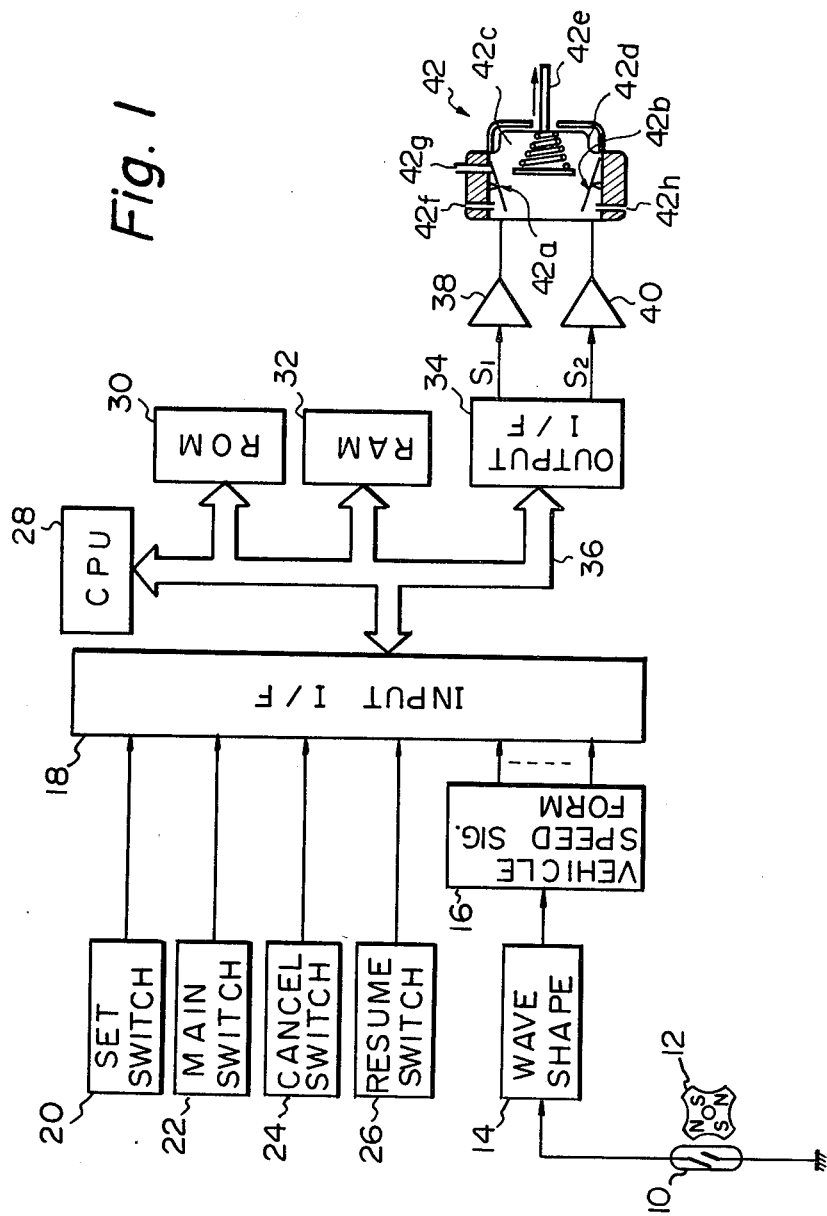
FIG. 1 is a block diagram illustrating an embodiment of the present invention.

The circuit in FIG. 1, includes a reed switch 10 adjacent a permanent magnet rotor 12 which is rotated by a speedometer cable. The reed switch 10 is closed and opened synchronously with rotation of the rotor 12, to generate pulse signals having a frequency proportional to the actual vehicle speed. The pulse signals are applied to a waveform shaping circuit 14 consisting, for example, of a monostable multivibrator and are converted into rectangular waves, and are further fed to a vehicle-speed signal forming circuit 16.

The vehicle-speed signal forming circuit 16 has a flip-flop, a binary counter and a gate. The flip-flop is alternately set and reset by the rectangular-wave pulses from the waveform shaping circuit 14, and the gate is opened while the flip-flop is either in its set or reset condition. When the gate is opened, clock pulses for actuating a microcomputer that will be described in more detail later are allowed to be fed to the counter and these clock pulses are counted. Consequently, the value counted by the counter varies in reverse proportion to the frequency of the rectangular-wave pulses, i.e., in reverse proportion to the actual vehicle speed, and is fed as a vehicle-speed signal to an input interface 18 of the microcomputer.

The input interface 18 further receives an output of a setting switch 20, which indicates whether the switch 20 is being actuated or not, an output of a main switch 22 for turning the vehicle speed control device on or off, an output of a cancel switch 24 actuated when the constant-speed control operation is to be interrupted, and an output of a resume switch 26 actuated when the previous constant-speed control operation is to be resumed after the cancel switch 24 has been actuated. The cancel switch 24 includes a stop-lamp switch, a parking brake switch, a neutral start switch and a clutch switch. The operations and functions of the main switch 22, cancel switch 24 and resume switch 26, are not illustrated, since they have no direct relation to the present invention.

A stored program microcomputer is used and includes a central processing unit (CPU) 28, a read-only memory (ROM) 30, a random access memory (RAM) 32, an output interface 34, the input interface 18, and a bus 36 for transferring the data among them. The control output for controlling an actuator 42 is formed by the microcomputer as will be mentioned later. A control valve 42a and a release valve 42b of the actuator 42 for driving the accelerator link (not shown) are electrically connected to the output interface 34 of the microcomputer via amplifier circuits 38 and 40, respectively.

When the control valve 42a and the release valve 42b are closed, a chamber 42c is connected to the intake manifold of the engine to reduce the pressure in the chamber 42c so as to move a diaphragm 42d. Therefore, a rod 42e connected to the accelerator link changes the setting of the throttle valve. Opening either of the valves 42a or 42b has the reverse effect. Control of the rod 42e thus controls the vehicle speed without the necessity of having the driver operate the accelerator pedal. When a control output $S_1$ of the logical level of "1" is fed from the microcomputer to a corresponding bit position of the output interface 34, current is applied from the amplifier 38 to the control valve 42a. This causes a port 42f that would admit air to the chamber 42c to be closed and a port 42g that leads to a vacuum manifold to be opened, thereby reducing pressure in the chamber 42c. When the control output $S_1$ has the logical level of "0", no current is applied to the control valve 42a. As a result, air is introduced through the port 42f to the chamber 42c, and the port 42g leading to the vacuum manifold is closed. When a control output $S_2$ of the logical level of "1" is fed from the microcomputer to a corresponding bit position of the output interface 34, an electric current is supplied from the amplifier 40 to the release valve 42b to close a port 42h and prevent air from passing through it to the chamber 42. When the control output $S_2$ has the logical level of "0", no electric current is supplied from the amplifier 40, and the atmospheric pressure is introduced into the chamber 42c through the port 42h.

Figure 2:
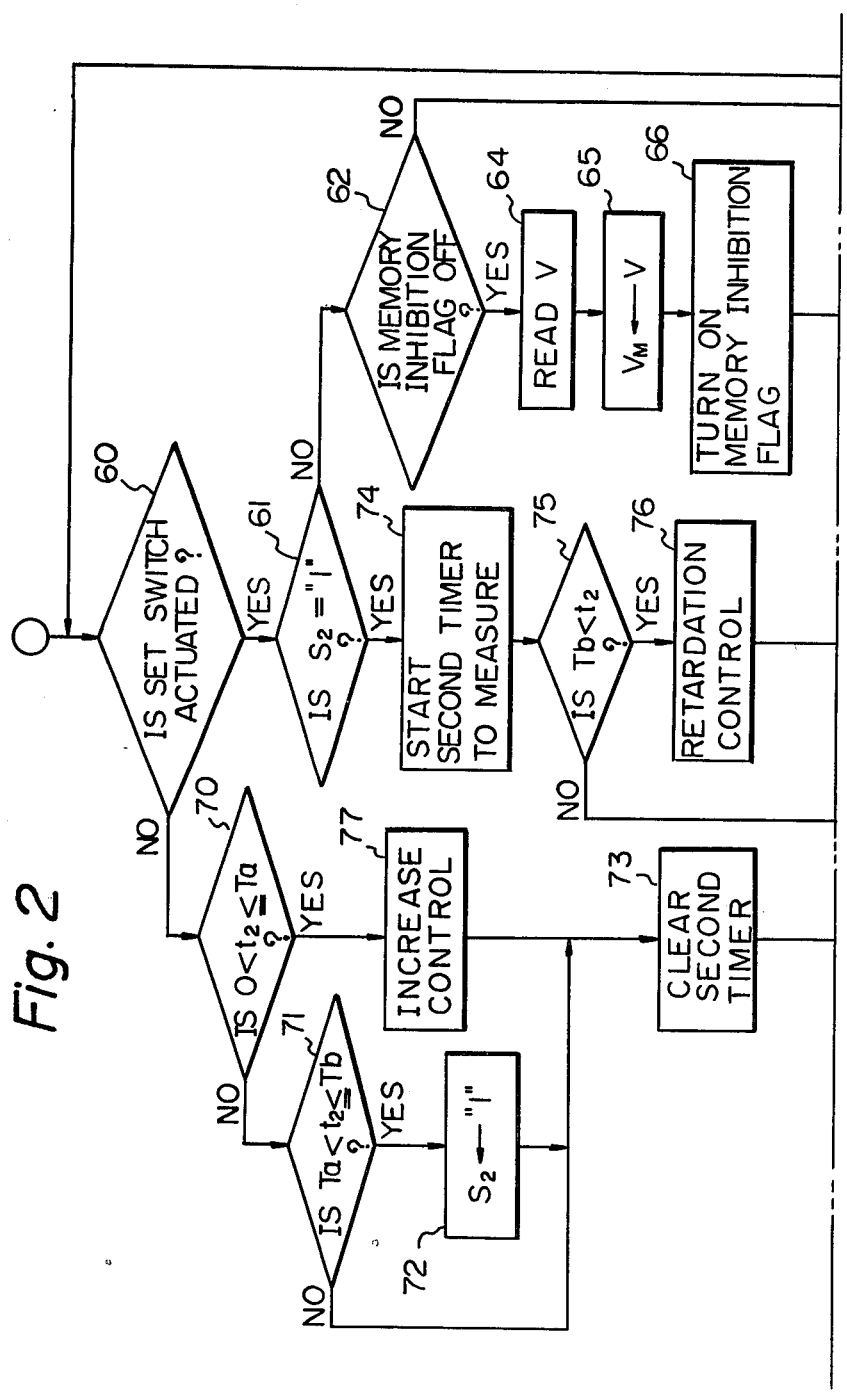
FIGS. 2A, 2B, 3, and 4 are flow diagrams illustrating control programs of the microcomputer in FIG. 1.
Figure 3:
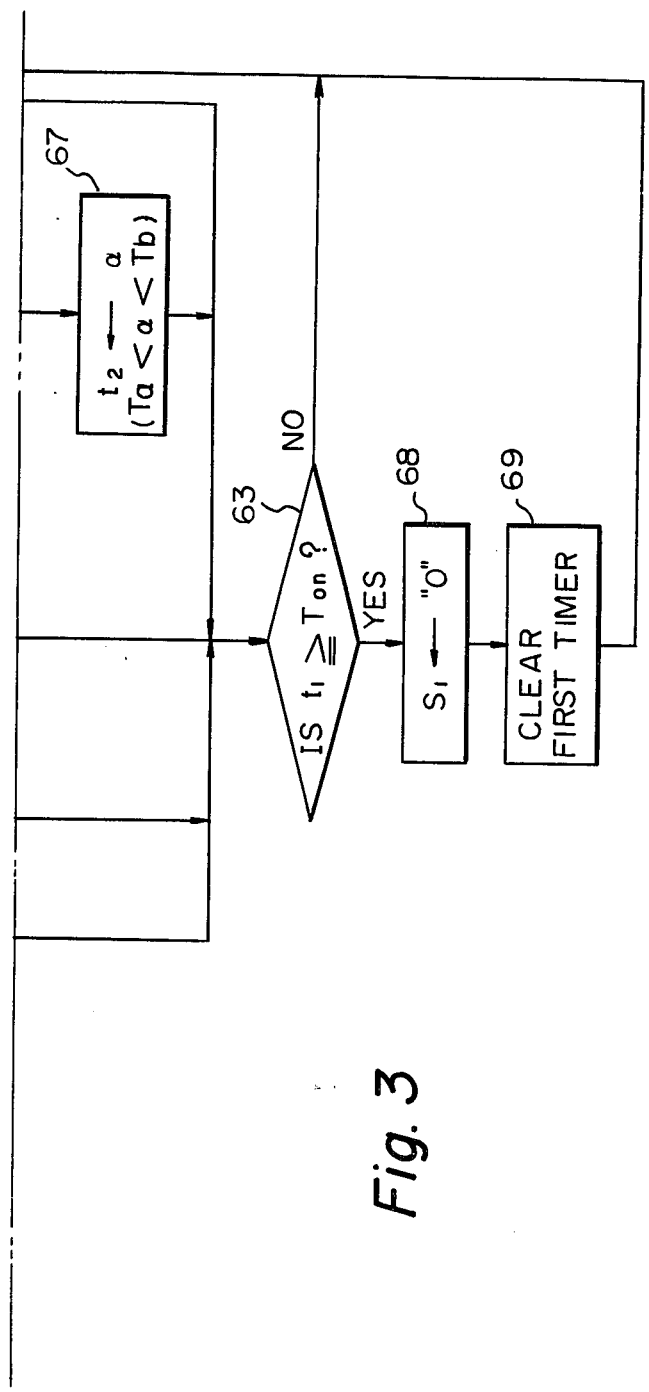

Next, the operation of the microcomputer will be explained below with reference to flow diagrams of FIGS. 2, 3, and 4. The control programs shown in these diagrams have been stored beforehand in the ROM 30. When the main switch 22 is turned on, the CPU 28 executes an initial processing routine, and then repetitively executes a main processing routine shown in FIGS. 2 and 3. The CPU 28 further executes an interrupt processing routine at every predetermined period, i.e., at every period which is equal to the period of signals for driving the control valve 42a of the actuator 42. For convenience, the interrupt processing routine of FIG. 3 is explained below, first.

Figure 5:
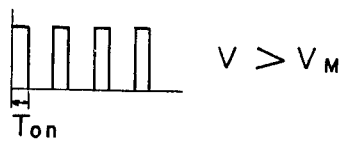
FIGS. 5, 6, and 7 are waveform diagrams of the drive signal applied to the control valve in FIG. 1.
Figure 6:
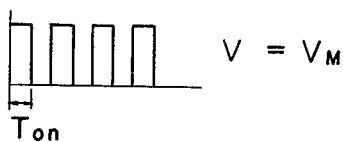
Figure 7:
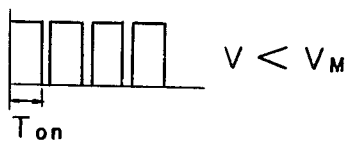

As the interrupt requirement occurs, the CPU 28 at point 50 introduces a vehicle-speed signal which represents an actual vehicle speed V. The vehicle-speed signal is regularly read by another processing routine from the vehicle-speed signal forming circuit 16 through the input interface 18, and is stored in a predetermined region in the RAM 32. At point 51, then, the CPU 28 compares a desired vehicle speed $V_M$ which is stored by a procedure explained below in a predetermined region in the RAM 32 with the above-mentioned actual vehicle speed V. At the next point 52, the CPU 28 calculates, based upon the compared result, a period $T_{on}$ of time which corresponds to a pulse width of the control output S, to be supplied to the control valve 42a of the actuator 42. When the actual vehicle speed V is greater than the desired vehicle speed $V_M$ ($V > V_M$), the pulse width $T_{on}$ becomes relatively short as shown in FIG. 5. When the actual vehicle speed V is equal to the desired vehicle speed $V_M$ ($V = V_M$), the pulse width $T_{on}$ is of medium duration, as shown in FIG. 6. When the actual vehicle speed V is smaller than the desired vehicle speed $V_M$ ($V < V_M$), the calculated pulse width $T_{on}$ becomes relatively long as shown in FIG. 7. The calculated pulse width $T_{on}$ is stored in the RAM 32, and is used for the main processing routine that will be mentioned later. In the next points 53 and 54, a first timer of the software is actuated to measure the period during which the electric current is allowed to flow into the control valve 42a, and the control output $S_1$ is inverted to the logical level of "1". That is, the electric current is allowed to flow into the control valve 42a from this moment, and a period $t_1$ for supplying the current for one operation is measured. When the processing at the point 54 is finished, the interrupt processing is finished and the program returns to the main processing routine in FIG. 2.

At a point 60 in the main processing routine, the CPU 28 determines whether the setting switch 20 is being actuated or not. When the setting switch 20 is being actuated, the program proceeds to a point 61 where it is determined whether the control output $S_2$ has the logical level of "1" or not. As mentioned earlier, the control output $S_2$ controls the flow of current to the release valve 42b of the actuator 42. When the control output $S_2$ has the logical level of "1", the release valve 42b is closed to carry out the vehicle speed control operation. When the control output $S_2$ has the logical level of "0", the release valve 42b is opened to stop the vehicle speed control operation. When the control output $S_2$ has the logical level of "0" at the point 61, i.e., when the setting switch 20 is being actuated but the vehicle speed control operation has not yet been carried out, the program proceeds to a point 62. The point 62 determines from a memory inhibition flag whether the desired vehicle speed $V_M$ can be stored. When the memory inhibition flag is "on", the program jumps to a point 63. When the memory inhibition flag is "off", the program proceeds to a point 64. At the point 64, the CPU 28 introduces the actual vehicle speed V from the RAM 32. At the next point 65, the actual vehicle speed V is stored as a desired vehicle speed $V_M$, then, at the following point 66, the memory inhibition flag is turned on. At the next point 67, a time $t_2$ measured by a second timer in the software for measuring the actuation period of the setting switch 20 is set to a predetermined value $\alpha$. The predetermined value $\alpha$ is selected so as to lie between a value $T_a$ and a value $T_b$ that will be mentioned later, i.e., selected so as to satisfy a relation $T_a < \alpha < T_b$. The times $T_a$ and $T_b$ are shown on the graph in FIG. 5. The program then proceeds to the point 63. Hereinafter, the program returns to the point 60, either directly from the point 63 or via points 68 and 69. Then, the program loops through the points 61, 62 and 63 as long as the setting switch 20 is continuously actuated.

Thereafter, if the actuation of the setting switch 20 is stopped and the switch 20 is turned off, the program proceeds from the point 60 to a point 70 where it is determined whether the time $t_2$ measured by the second timer satisfies a relation $0 < t_2 \leq T_a$ or not (FIG. 5). Here, however, since the time $t_2$ has been set to be $\alpha$, which is greater than $T_a$, at the point 67, the program proceeds to a point 71 where it is determined whether the time $t_2$ satisfies a relation $T_a < t_2 \leq T_b$. When the result is "YES", the program proceeds to a point 72 where the control output $S_2$ is set to the logical level of "1". This closes the release valve 42b of the actuator 42, and the automatic vehicle speed control operation is initiated. Thereafter, the second timer is cleared at a point 73, and the program proceeds to the point 63.

The points 63, 68 and 69 form a routine for controlling the time for supplying current to the control valve 42a in cooperation with the interrupt processing routine of FIG. 3. When the time $t_1$ measured by the first timer becomes equal to or greater than $T_{on}$, the control output $S_1$ is set to the logical level of "0" at the point 68 to stop the electric current from being supplied to the control valve 42a. The first timer is cleared at the point 69. Accordingly, a period for supplying the current to the control valve 42a for one operation is controlled so as to become equal to the calculated time $T_{on}$.

Figure 4:
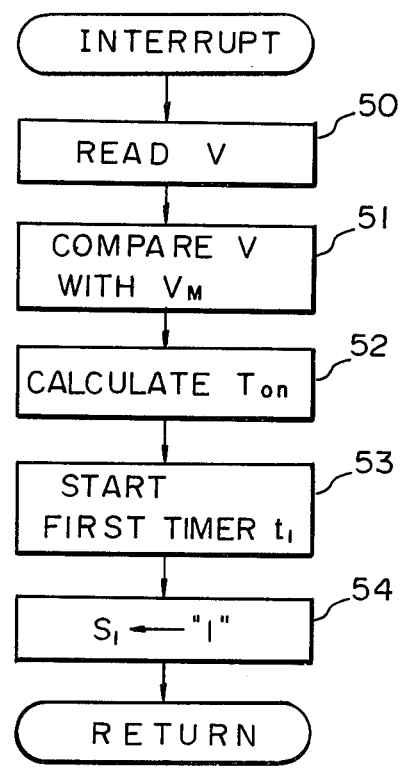

As has been mentioned already with reference to FIG. 4, when the desired vehicle speed $V_M$ is less than the actual vehicle speed V, i.e., $V_M<V$, the current-supplying period for the control valve 42a becomes shorter than when $V=V_M$. Therefore, the throttle valve is moved toward the closing direction so that the actual vehicle speed decreases. When $V<V_M$, the current-supplying period for the control valve 42a becomes longer than when $V=V_M$. Therefore, the throttle valve is moved toward the opening direction so that the actual vehicle speed increases.

Figure 8:
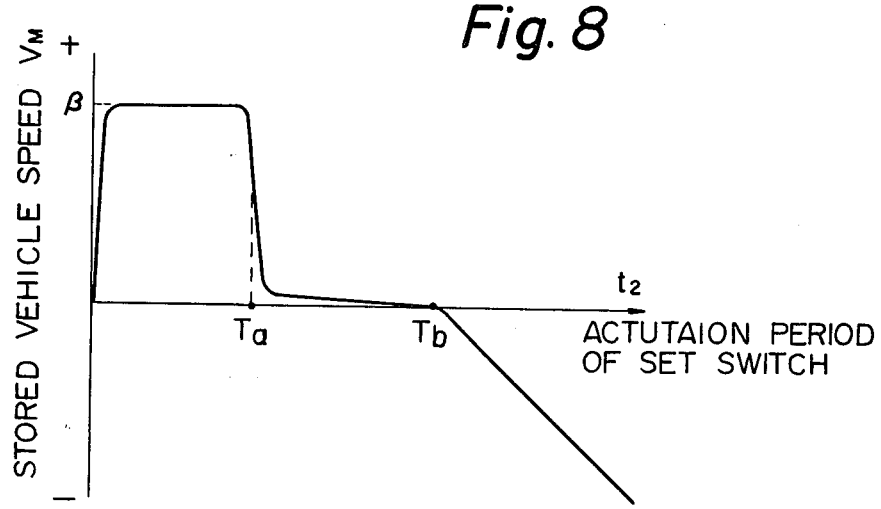
FIG. 8 is a graph illustrating the relationship between the length of time the set switch is actuated and the stored vehicle speed.

If the setting switch 20 is actuated during the automatic vehicle speed control operation, i.e., while the control output $S_2$ is at the logical level of "1", the desired vehicle speed $V_M$ is controlled depending upon the actuation period of the setting switch 20. That is, when it is determined at the point 60 that the setting switch 20 is being actuated and that $S_2=1$, the program proceeds to a point 74 via the point 61, and the second timer starts to measure the actuation period. Then, at a point 75, the CPU 28 determines whether the time $t_2$ measured by the second timer, which is the duration of actuating the setting switch 20, is longer than the duration $T_b$ or not. When the set switch 20 is continuously actuated for a period of time longer than the duration $T_b$, the program proceeds to the point 76 where the retardation control operation is carried out. When the retardation control operation is carried out, the control output $S_1$ is always maintained at the logical level of "0" to close the throttle valve, and the actual vehicle speed V at this moment is stored as a desired vehicle speed $V_M$. Referring to FIG. 8, the desired vehicle speed $V_M$, which decreases with the increase in the time $t_2$ of actuation of the switch 20, does so at a reduction rate which is determined by the load conditions of the vehicle at that time.

When the time $t_2$ of actuation of the setting switch 20 is shorter than the duration $T_b$, the next loop of the program proceeds from the point 60 to the point 70 where it is determined whether the relation $0<t_2 \leq T_a$ is satisfied or not. When the result is "YES", the program proceeds to the point 77 to carry out the increase control operation. As illustrated in FIG. 8, the increase control operation causes the desired vehicle speed $V_M$ to be increased by a predetermined value, for example, by a value of $\beta$. When the time $t_2$ of actuation of the setting switch 20 is longer than the duration Ta but is shorter than or equal to the duration $T_b$, i.e. when $(T_a<t_2 \leq T_b)$, the program proceeds from the point 71 to the point 72. Therefore, the desired vehicle speed $V_M$ does not change, as shown in FIG. 8.

According to the present invention as illustrated in detail in the foregoing, when the setting switch is operated without the automatic vehicle speed control operation having been previously effected, a desired vehicle speed is set irrespective of the actuation period of the set switch. It is therefore possible to correctly set the desired vehicle speed prior to initiating the automatic vehicle speed control operation.

As many widely different embodiments of the present invention may be constructed without departing from the spirit and scope of the present invention, it should be understood that the present invention is not limited to the specific embodiments described in this specification, except as defined in the appended claims.

I claim:

1. A method for automatically controlling a vehicle speed, the method including selectively setting a reference signal representative of a desired vehicle speed, detecting an actual vehicle speed, generating a speed signal representative of the detected actual vehicle speed, comparing the speed signal to the reference signal, and adjusting the actual vehicle speed to reduce the difference between the compared signals, wherein the step of selectively setting a reference signal representative of a desired vehicle speed comprises:

generating an instruction signal whenever it is desired to selectively set a reference signal representative of a desired vehicle speed;

determining, in response to each instruction signal, whether or not a previously set automatic control of vehicle speed is in effect;

selectively performing, in response to a determination that a previously set automatic control of vehicle speed is in effect,
an increase operation for increasing a previously set reference signal, or
a maintenance operation for maintaining unchanged a previously set reference signal, or
a retardation operation for reducing a
previously set reference signal, the operation to be performed being determined by selecting a duration of the instruction signal; or performing, in response to a determination that a previously set automatic control of vehicle speed is not in effect, a setting operation for equalizing a reference signal to a speed signal representative of a detected actual vehicle speed, only the setting operation being performed regardless of the duration of the instruction signal, wherein performing the setting operation comprises repeatedly equalizing the reference signal to the speed signal representative of the detected actual vehicle speed at predetermined intervals during actuation of the instruction switch.

2. A method for automatically controlling a vehicle speed according to claim 1, wherein performing the increase operation comprises increasing a previously set reference value by a predetermined amount at the conclusion of a corresponding instruction signal.

3. A method for automatically controlling a vehicle speed according to claim 1, wherein performing the retardation operation comprises decelerating a vehicle from a previously controlled speed to a lower actual speed and equalizing a reference signal to a speed signal representative of said lower actual speed.

4. A method for automatically controlling a vehicle speed, the method including selectively setting a reference signal representative of a desired vehicle speed, detecting an actual vehicle speed, generating a speed signal representative of the detected actual vehicle speed, comparing the speed signal to the reference signal, and adjusting the actual vehicle speed to reduce the difference between the compared signals, wherein the step of selectively setting a reference signal representative of a desired vehicle speed comprises:

generating an instruction signal whenever it is desired to selectively set a reference signal representative of a desired vehicle speed;

determining, in response to each instruction signal, whether or not a previously set automatic control of vehicle speed is in effect;

selectively performing, in response to a determination that a previously set automatic control of vehicle speed is in effect, an increase operation for increasing a previously set reference signal, or a maintenance operation for maintaining unchanged a previously set reference signal, or a retardation operation for reducing a previously set reference signal, the operation to be performed being determined by selecting a duration of the instruction signal, the increase operation being performed when the selected duration of the instruction signal is less than or equal to the duration of a predetermined first period, the maintenance operation being performed when the selected duration of the instruction signal is greater than the first period and less than or equal to the duration of a predetermined second period which is longer than the first period, and the retardation operation being performed when the selected duration of the instruction signal is greater than the duration of the second period; or performing, in response to a determination that a previously set automatic control of vehicle speed is not in effect, a setting operation for equalizing a reference signal to a speed signal representative of a detected actual vehicle speed, only the setting operation being performed regardless of the duration of the instruction signal.

5. A method for automatically controlling a vehicle speed, the method including selectively setting a reference signal representative of a desired vehicle speed, detecting an actual vehicle speed, generating a speed signal representative of the detected actual vehicle speed, comparing the speed signal to the reference signal, and adjusting the actual vehicle speed to reduce the difference between the compared signals, wherein the step of selectively setting a reference signal representative of a desired vehicle speed comprises:

generating an instruction signal whenever it is desired to selectively set a reference signal representative of a desired vehicle speed;

determining, in response to each instruction signal, whether or not a previously set automatic control of vehicle speed is in effect;

selectively performing, in response to a determination that a previously set automatic control of vehicle speed is in effect, an increase operation for increasing a previously set reference signal, or a maintenance operation for maintaining unchanged a previously set reference signal, or a retardation operation for reducing a previously set reference signal, the operation to be performed being determined by selecting a duration of the instruction signal, the increase operation being performed when the selected duration of the instruction signal is less than or equal to the duration of a predetermined first period, the maintenance operation being performed when the selected duration of the instruction signal is greater than the first period and less than or equal to the duration of a predetermined second period which is longer than the first period, and the retardation operation being performed when the selected duration of the instruction signal is greater than the duration of the second period, the retardation operation comprising continuously decelerating a vehicle for the duration of the instruction signal that exceeds the duration of the second period and periodically equalizing a reference signal to a speed signal corresponding to a detected actual speed of the vehicle during said continuous deceleration; or performing, in response to a determination that a previously set automatic control of vehicle speed is not in effect, a setting operation for equalizing a reference signal to a speed signal representative of a detected actual vehicle speed, only the setting operation being performed regardless of the duration of the instruction signal.

* * * * *